United States Patent
Panda et al.

(10) Patent No.: US 12,298,286 B2
(45) Date of Patent: May 13, 2025

(54) METHOD FOR SEPARATION AND QUANTITATION OF BENZENE, TOLUENE, ETHYL BENZENE, O-XYLENE, M-XYLENE, AND P-XYLENE (BTEX) USING HIGH PERFORMANCE LIQUID CHROMATOGRAPHY

(71) Applicant: SAUDI ARABIAN OIL COMPANY, Dhahran (SA)

(72) Inventors: Saroj Kumar Panda, Dhahran (SA); Amal Lajami, Qatif (SA); Robert Peter Hodgkins, Dhahran (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 441 days.

(21) Appl. No.: 17/849,249

(22) Filed: Jun. 24, 2022

(65) Prior Publication Data

US 2023/0417715 A1  Dec. 28, 2023

(51) Int. Cl.
*G01N 30/88* (2006.01)
*G01N 30/86* (2006.01)

(52) U.S. Cl.
CPC ......... *G01N 30/88* (2013.01); *G01N 30/8665* (2013.01); *G01N 2030/884* (2013.01)

(58) Field of Classification Search
CPC ........ G16B 20/00; G16B 20/20; G16B 20/40; G16B 30/00; G01N 2030/884;

(Continued)

(56) References Cited

U.S. PATENT DOCUMENTS

| 10,053,401 B1 | 8/2018 | Beadle et al. |
| 10,190,987 B2 | 1/2019 | Perez Pellitero et al. |

(Continued)

FOREIGN PATENT DOCUMENTS

| CN | 110161165 A | 8/2019 |
| CN | 110554107 A | 12/2019 |

(Continued)

OTHER PUBLICATIONS

Abadi, et al., Simultaneous Extraction and Preconcentration of Benzene, Toluene, Ethylbenzene and Xylenes from Aqueous Solutions Using Magneite-Graphene Oxide Composites, Chemical Methodologies, 5(2021), pp. 11-20.

(Continued)

*Primary Examiner* — Kristina M Deherrera
*Assistant Examiner* — Gedeon M Kidanu
(74) *Attorney, Agent, or Firm* — Bracewell LLP; Constance G. Rhebergen; Eleanor T. Porter

(57) ABSTRACT

Disclosed are methods and systems for quantitation of benzene, toluene, ethyl benzene, o-xylene, m-xylene, and p-xylene. High-performance liquid chromatography using a carbon stationary phase and a gradient mobile phase is performed. The carbon stationary phase can be a porous graphitic carbon stationary phase. The mobile phase includes an organic acid in water and an alcohol. The organic acid can include formic acid, and the alcohol can include methanol. The methods and systems achieve a resolution between xylene isomer peaks of greater than 2.0.

14 Claims, 4 Drawing Sheets

(58) Field of Classification Search
CPC ..... G01N 2030/027; G01N 2030/8854; G01N 30/02; G01N 30/34; G01N 30/8665; G01N 30/88; B01D 15/08
See application file for complete search history.

(56) References Cited

U.S. PATENT DOCUMENTS

| | | | |
|---|---|---|---|
| 10,294,172 | B2 | 5/2019 | Beadle |
| 10,392,324 | B2 * | 8/2019 | Weber .................... C07C 15/08 |
| 10,508,066 | B2 | 12/2019 | Koseoglu et al. |
| 10,894,755 | B2 | 1/2021 | Xu et al. |
| 12,181,401 | B2 * | 12/2024 | Kottapalli .......... G01N 33/0027 |
| 2005/0106741 | A1 * | 5/2005 | Dijke .................... G01N 33/03 |
| | | | 436/140 |

FOREIGN PATENT DOCUMENTS

| | | | |
|---|---|---|---|
| CN | 111983090 | A | 11/2020 |
| JP | 2002062286 | A | 2/2002 |
| KR | 102343702 | B1 | 12/2021 |
| TW | 382874 | B | 2/2000 |

OTHER PUBLICATIONS

Ash, et al., Eluxyl: A New Paraxylene Separation Process, Chevron Chemical Company, SFS-20 , Setting the Pace with IFP, Jul. 2000, pp. 271-283, https://www.researchgate.net/publication/245277365_System_Approach_Modeling_Applied_to_the_Eluxyl_Process.

ASTM International, Standard Test Method for Determination of Benzene Toluene Ethylbenzene, p/m-Xylene, o-Xylene, c9 and Heavier Aromatics, and Total Aromatics in Finished Gasoline by Gas Chromatography, SFS-D5580 31469 (2021), pp. 1-12.

Bao, et al., Simultaneous Determination of BTEX in water by High Performance Liquid Chromatography, Guizhou Chemical Industry, 2011, 1pg.

Campos-Candel, et al., Comparative evaluation of liquid chromatography versus gas chromatography-Beta cyclodextrin, Elsevier, Talanta 78 (2009), pp. 1286-1292.

Pereire, Porous Graphitic Carbon as a Stationary Phase in HPLC: Theory and Applications, Journal of Liquid Chromatography & Related Technologies, 31:11-12, pp. 1687-1731, 2008.

Rodriguez, Assessment of Polycrystalline Graphites as Sorbents for Solid Phase Microextraction Coupled to High Performance Liquid Chromatography, Carleton University, Ottawa, Ontario, Canada; May 2000, 206 pgs.

Tan, et al., An HPCL-DAD Method for Rapid and High Resolution Analysis of Concentrated BTEX and Styrene Aqueous Samples, Nanyang Technological University, Singapore (2012), 21 pgs.

Thermo Hypercarb Brochure, Catalog, HPLC and LC/MS, 2019, pp. 101-105, www.thermo.com/columns.

Andrews, et al., The Development of an Inline Raman Spectroscopic Analysis Method as a Quality Control Tool for Hot melt Extruded Ramipril Fixed-dose Combination Products, International Journal of Pharmaceutics, vol. 566, Jul. 20, 2019, 476-487.

* cited by examiner

METHOD FOR SEPARATION AND QUANTITATION OF BENZENE, TOLUENE, ETHYL BENZENE, O-XYLENE, M-XYLENE, AND P-XYLENE (BTEX) USING HIGH PERFORMANCE LIQUID CHROMATOGRAPHY

FIELD

This disclosure relates to a method of separation and quantitation of benzene, toluene, ethyl benzene, and xylenes (BTEX) using high performance liquid chromatography. More specifically, this disclosure relates to the separation and quantitation of aromatic compounds such as ethyl benzene and xylene isomers from BTEX for use in industrial applications.

BACKGROUND

Analysis of benzene, toluene, ethyl benzene, and xylenes (BTEX) has conventionally been performed using gas chromatography techniques or Raman spectroscopy. These conventional techniques, however, were not able to obtain efficient resolution for challenging ethyl benzene and xylene isomers. Other techniques utilizing synthesized stationary phases and liquid chromatography were developed for BTEX separation, but were not commercially available for widespread application in the research and industry fields. The conventional methods are lacking in that they do not obtain efficient resolution of ethyl benzene and xylene isomers, especially for industrial applications.

Crude oil has a large number of differing compounds which are refined and processed for various products including transportation fuels and petrochemicals. Recently, declining petroleum-based fuel usage and growth in petrochemical demand has pushed the petroleum industry to convert a substantial portion of crude oil to petrochemicals such as olefins, aromatics, glycols, and polymers. BTEX compounds are fundamental building blocks for a range of chemicals and polymers. Given the continued and rising importance of BTEX in various industries, a need exists for new methods to separate and quantify ethyl benzene and the individual xylene isomers, especially para-xylenes, in BTEX samples from industrial settings.

SUMMARY

Methods and systems for high-performance liquid chromatography for the separation of BTEX with a resolution between xylene isomer peaks of greater than 2.0 are disclosed herein. A stationary carbon phase and UV and fluorescence detectors are used. A commercially available porous graphitic carbon phase can be used. A mobile phase composition of organic acid in water and alcohol can be used. The composition of the mobile phase is altered over time. The resolution between two adjacent xylene isomer peaks (o-xylene and p-xylene) using this method is greater than 2.0. The quantification of xylene isomers was achieved by preparing calibration standards of different concentrations of 10 ppm, 50 ppm, 100 ppm, and 500 ppm for each isomer and measuring the response from the fluorescence detector (or peak height, or alternately peak area). Linear calibration plots were generated which can be used to quantify the amount of each isomer in the sample.

Disclosed is a method for the determination of concentrations of aromatic hydrocarbon components in industrial samples. The method includes the steps of injecting a prepared sample into a high-performance liquid chromatography column. The high-performance liquid chromatography column includes a carbon stationary phase. The prepared sample includes aromatic hydrocarbon components. The aromatic hydrocarbon components are selected from the group including benzene, toluene, ethyl benzene, xylene isomers, and combinations of the same. The xylene isomers are selected from the group including o-xylene, p-xylene, m-xylene, and combinations of the same. The method also includes the step of introducing a mobile phase into the carbon stationary phase. The mobile phase includes an organic acid in water and an alcohol. The method further includes the step of increasing the concentration of the alcohol in the mobile phase and decreasing the concentration of the organic acid in water in the mobile phase so that the mobile phase reaches a concentration of 100% of the alcohol and 0% of the organic acid in water, so that a gradient elution is performed. Then the method includes the step of decreasing the concentration of the alcohol in the mobile phase and increasing the concentration of the organic acid in water in the mobile phase. The method also includes the step of quantitating based on the gradient elution a concentration of the xylene isomers in the prepared sample.

In some embodiments, the method produces a resolution of greater than 2.0 of p-xylene from o-xylene and ethyl benzene. The prepared sample is prepared from a sample comprising a xylene isomers concentration in the range from 0.001 wt % to 0.05 wt %. In some embodiments, the method includes the steps of preparing a sample for analysis by diluting the sample with an alcohol, generating a first dilution; filtering the first dilution, generating a filtered first dilution; and diluting the filtered first dilution with alcohol, generating the prepared sample. The concentration of organic acid is 0.1 vol % in water. The organic acid is formic acid. The alcohol is methanol.

In some embodiments, the steps of increasing the concentration of the alcohol in the mobile phase and decreasing the concentration of the organic acid in water in the mobile phase, then decreasing the concentration of the alcohol in the mobile phase and increasing the concentration of the organic acid in water in the mobile phase, is carried out in accordance with the following time intervals and concentrations:

| Time (min) | Organic Acid in Water (vol % of the mobile phase) | Alcohol (vol % of the mobile phase) |
| --- | --- | --- |
| 0.00 | 50 | 50 |
| 40.0 | 20 | 80 |
| 50.0 | 0 | 100 |
| 55.0 | 0 | 100 |
| 55.1 | 50 | 50 |
| 65.0 | 50 | 50. |

In some embodiments, the mobile phase is introduced at a rate of less than or equal to 1 mL/minute. The carbon stationary phase is a porous graphitic carbon stationary phase. The prepared sample is obtained from an industrial process. The industrial process is selected from the group including aromatics processing, aromatics separation, hydrodearylation, transalkylation, fluid catalytic cracking, thermal cracking, steam cracking, hydroprocessing, reforming, petrochemical processing, and combinations of the same.

In some embodiments, the step of quantitating, based on the gradient elution, a concentration of the o-xylene, p-xylene, and m-xylene components in the prepared sample includes the steps of analyzing a calibration standard by injecting a calibration standard into a high-performance liquid chromatography column. The high-performance liquid chromatography column includes a carbon stationary phase. The calibration standard includes aromatic hydrocarbon components. The aromatic hydrocarbon components are selected from the group including benzene, toluene, ethyl benzene, xylene isomers, and combinations of the same. The xylene isomers are selected from the group including o-xylene, p-xylene, m-xylene, and combinations of the same. The method also includes the step of introducing a mobile phase into the carbon stationary phase. The mobile phase includes an organic acid in water and an alcohol. The method also includes the steps of increasing the concentration of the alcohol in the mobile phase and decreasing the concentration of the organic acid in water in the mobile phase so that the mobile phase reaches a concentration of 100% of the alcohol and 0% of the organic acid in water, so that a gradient elution is performed; then decreasing the concentration of the alcohol in the mobile phase and increasing the concentration of the organic acid in water in the mobile phase. The method also includes the steps of generating a calibration standard chromatogram, and constructing a linear calibration plot for o-xylene, p-xylene, and m-xylene based upon the calibration standard chromatogram. The method also includes the step of determining a peak height of each of the o-xylene, p-xylene, and m-xylene peaks separately. Each peak height is calculated from a resulting sample chromatogram, where the resulting sample chromatogram is generated by an analysis of the prepared sample. The method also includes the step of calculating a quantity of each of o-xylene, p-xylene, and m-xylene in the prepared sample by correlating the resulting sample chromatogram with the linear calibration plot.

In some embodiments, the step of quantitating, based on the gradient elution, a concentration of the o-xylene, p-xylene, and m-xylene components in the prepared sample includes the steps of analyzing a calibration standard by injecting a calibration standard into a high-performance liquid chromatography column. The high-performance liquid chromatography column includes a carbon stationary phase. The calibration standard includes aromatic hydrocarbon components. The aromatic hydrocarbon components are selected from the group including benzene, toluene, ethyl benzene, xylene isomers, and combinations of the same. The xylene isomers are selected from the group including o-xylene, p-xylene, m-xylene, and combinations of the same. The method also includes the step of introducing a mobile phase into the carbon stationary phase. The mobile phase includes an organic acid in water and an alcohol. The method also includes the steps of increasing the concentration of the alcohol in the mobile phase and decreasing the concentration of the organic acid in water in the mobile phase so that the mobile phase reaches a concentration of 100% of the alcohol and 0% of the organic acid in water, so that a gradient elution is performed; then decreasing the concentration of the alcohol in the mobile phase and increasing the concentration of the organic acid in water in the mobile phase. The method also includes the steps of generating a calibration standard chromatogram, and constructing a linear calibration plot for o-xylene, p-xylene, and m-xylene based upon the calibration standard chromatogram. The method also includes the step of determining a peak area of each of the o-xylene, p-xylene, and m-xylene peaks separately. Each peak area is calculated from a resulting sample chromatogram, where the resulting sample chromatogram is generated by an analysis of the prepared sample. The method also includes the step of calculating a quantity of each of o-xylene, p-xylene, and m-xylene in the prepared sample by correlating the resulting sample chromatogram with the linear calibration plot.

Also disclosed is a system for the determination of concentrations of aromatic hydrocarbon components in industrial samples. The system includes a high-performance liquid chromatography column. The high-performance liquid chromatography column includes a carbon stationary phase, a mobile phase including an organic acid in water and an alcohol, a UV detector, and a fluorescence detector. The system is configured to perform a gradient elution so that the mobile phase reaches a concentration of 100% of the alcohol and 0% of the organic acid in water. The system is also configured to analyze a sample comprising aromatic hydrocarbon components. The aromatic hydrocarbon components are selected from the group including benzene, toluene, ethyl benzene, xylene isomers, and combinations of the same. The xylene isomers are selected from the group including o-xylene, p-xylene, m-xylene, and combinations of the same. The system is configured so that a sample chromatogram can be generated.

In some embodiments, the UV detector operates at 254 nm. The fluorescence detector operates with an excitation at 200 nm and an emission at 300 nm. The carbon stationary phase is a column having a length of equal to or greater than 250 mm. In some embodiments, the carbon stationary phase is a porous graphitic carbon stationary phase. The porous graphitic carbon stationary phase is a commercially available. The system is configured to operate at 30° C.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

DETAILED DESCRIPTION

Figure 1:
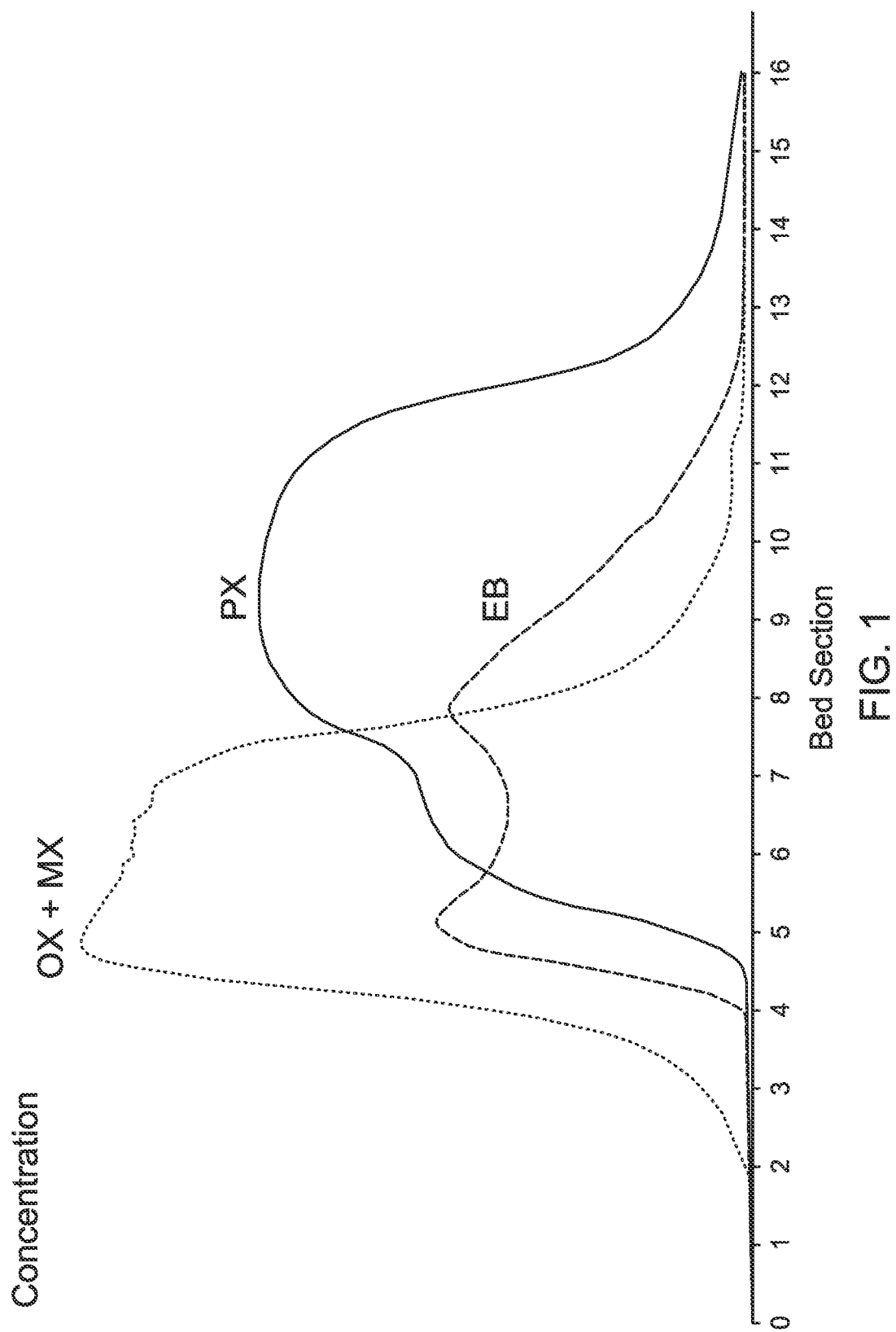
FIG. 1 is a concentration profile of Raman spectroscopy analysis for BTEX representative of prior art.

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

The terms "comprising," "including," "having," and the like, as used with respect to embodiments of the present disclosure, are synonymous and are each intended to have an open, non-limiting meaning that does not exclude additional elements or steps. In this disclosure and the appended claims, the terms "about" and "approximately" can include a deviation of ±5% of the given value unless the deviation changes the nature or effect of the value such that it is not operable to achieve its intended purpose. The terms "optional" or "optionally" mean that an element can be used for some embodiments, but can be omitted in other embodiments. The singular forms "a," "an," and "the" include plural referents, unless the context clearly dictates otherwise.

Methods of high-performance liquid chromatography for the analysis of aromatic compounds such as BTEX in samples, specifically industrial samples, are disclosed. A resolution between ethyl benzene and the individual xylene isomer peaks of greater than 2.0 can be obtained. The method utilizes a carbon stationary phase, as well as UV and fluorescence detectors. A varying mobile phase composition of organic acid in water and methanol is used. The samples are industrial samples and can be minimally processed before analysis. The samples contain other components that conventional methods can have difficulty in analyzing or reporting. Conventional methods can be easily incapacitated by contaminants that can cause insufficient separation of components, which can result in unclear results and an inability to identify or quantify components.

The samples that can be analyzed utilizing these methods include industrial process samples containing BTEX, including those BTEX samples that are derived from reformate, coal liquefaction products, gasification products, or other petrochemical products. Other industrial samples that can be analyzed utilizing the methods disclosed herein include feed or product from aromatic aromatics processing, aromatics separation, hydrodearylation, transalkylation, fluid catalytic cracking, thermal cracking, steam cracking, hydroprocessing, reforming, petrochemical processing, and combinations of the same. Specifically of interest are samples derived from aromatics complexes. Aromatics complexes convert naphtha or pyrolysis gasoline into BTEX, which are base petrochemical intermediates. In many aromatic complexes, the mixed xylenes generated are further processed to target production of p-xylene. P-xylene is of particular interest as it can be further processed to produce terephthalic acid, an important component in producing polyesters. To increase BTEX production, transalkylation and toluene disproportionation process units are utilized. When p-xylene is recovered from mixed xylenes by a selective adsorption process unit, the feed to the selective adsorption process unit is processed through catalytic reactions and fractionation to eliminate olefins and alkenyl aromatics, including styrene, from the feed. In preferred embodiments, the xylene concentration of the sample being tested ranges from 0.001 wt % to 0.05 wt % after the sample preparation step of dilution of the sample with alcohol.

Advantageously, the methods disclosed herein allow for the quantitation and separation of aromatic components, specifically benzene, toluene, ethyl benzene, o-xylene, m-xylene, and p-xylene. The methods also allow for the quantification of separate xylene isomers and ethyl benzene. The resolution between the xylene isomers is more than approximately 2, which exceeds prior art resolutions and allows for better separation and quantitation of the various xylene isomers. Additionally, the resolution between the xylene isomers and ethyl benzene is also more than approximately 2, which exceeds prior art resolutions and allows for better separation and quantitation of the compounds. Beneficially, the stationary phase graphitic column that can be utilized in the method is commercially available. Additionally, the method can be used on industrial processes samples and still provide significant resolution. Industrial process samples can have substantially higher BTEX concentrations that what can be analyzed in conventional systems. Conventional processes for the quantitation and separation of aromatic components using gas or liquid chromatography generally cannot handle the high concentrations in industrial samples due to the inability to separate the components at high concentrations. Additionally, industrial samples are far more complex and contain unknown compounds in comparison to the standard mixtures; however, the methods disclosed herein are advantageously able to analyze industrial samples. In the presently disclosed methods, the samples from industrial processes do not need to undergo complex processing or separation before analysis; instead, the samples are only diluted and simply filtered prior to analysis, which is standard for chromatography analysis. The preparation of the samples (either industrial or standard calibration samples) occurs in the absence of any other separation, processing, or additional filtration.

Conventional methods do not provide the above advantages. Referring to FIG. 1, a concentration profile is shown from a conventional Raman spectroscopy analysis measuring BTEX concentration. FIG. 1 is a reproduction of Figure 4 from the publication Ash et al., "Eluxyl: A New Paraxylene Separation Process," Revue de L'institut Francais du Petrol, 49 (1994), 541-549. The conventional method uses fiber optics to transmit the spectrum concentration profiles in the column. As seen in FIG. 1, even when a xylene adsorptive separation column is utilized, the method fails to provide clear separation between the components. The o-xylene and m-xylene peaks are combined, and the curves for o-xylene and m-xylene, p-xylene, and ethyl benzene overlap across multiple bed sections.

Figure 2:
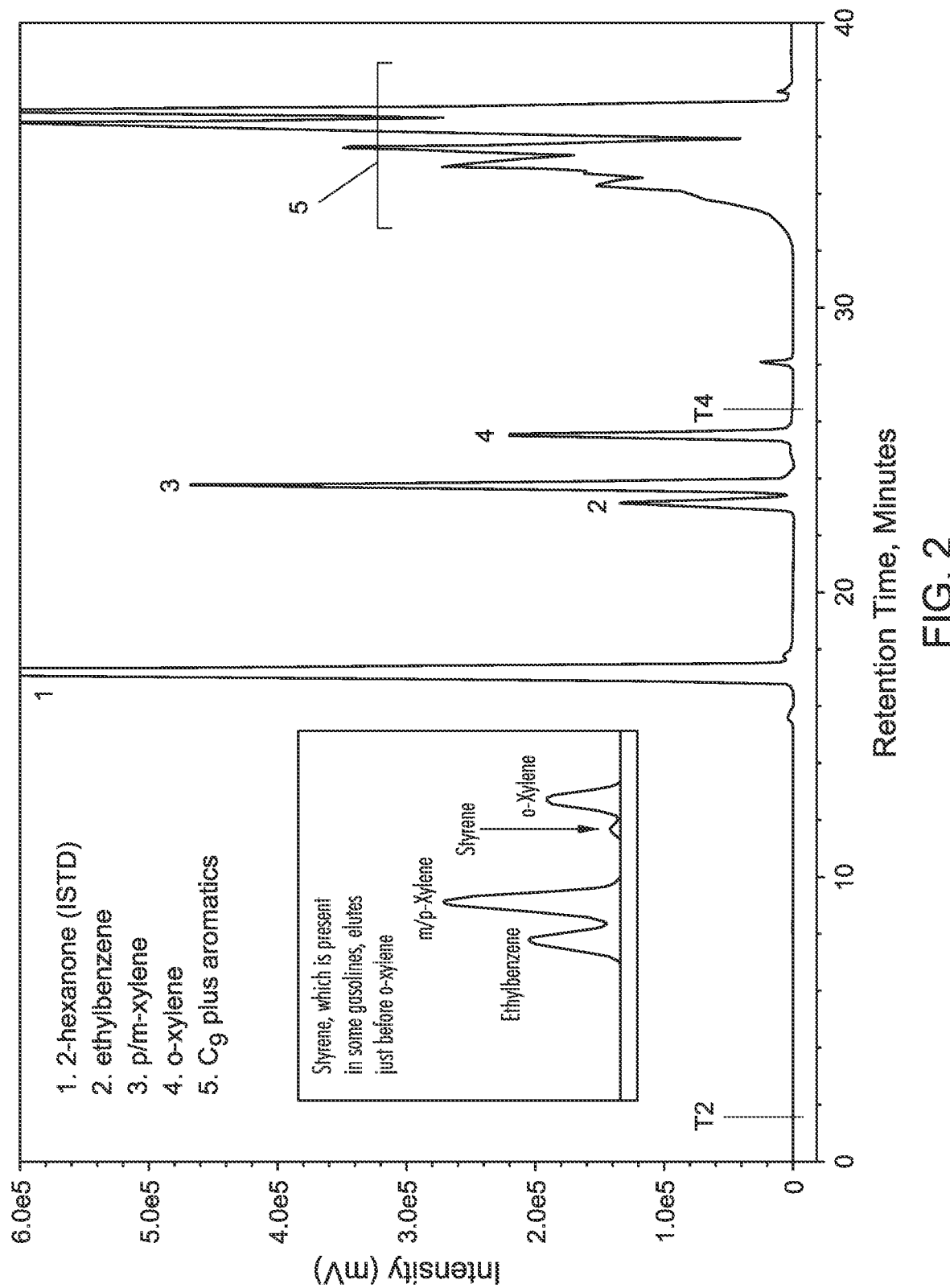
FIG. 2 is a chromatogram of ASTM D5580-21 analysis for BTEX representative of prior art.

Referring to FIG. 2, a chromatograph shows the results of an ASTM D5580-21 standard test for the determination of BTEX components in gasoline, with identification of the various component peaks. FIG. 2 is a reproduction of Figure 5 from the ASTM D5580-21 testing standards, "Standard Test Method for Determination of Benzene, Toluene, Ethylbenzene, p/m-Xylene, o-Xylene, $C_9$ and Heavier Aromatics, and Total Aromatics in Finished Gasoline by Gas Chromatography," ASTM International, 2021. Again, the conventional method of ASTM D5580-21 does not separate p-xylenes and m-xylenes.

The methods disclosed herein resolve these issues by utilizing a high-performance liquid chromatographic method to detect aromatic compounds, such as BTEX, including xylene isomers such as m-xylene, o-xylene, and p-xylene. The high-performance liquid chromatographic method utilizes a carbon stationary phase. In some embodiments, the carbon stationary phase is equal to or greater than 250 mm in length. Generally, longer columns allow for greater resolution due to improved separation. In preferred embodiments, the carbon stationary phase is a porous graphitic carbon phase column. A commercially available porous graphitic carbon phase column can be used for the methods disclosed herein, and can be purchased readily, such as a Hypercarb® column from Thermo Scientific Limited Company. The porous graphitic carbon phase column can be 250 mm (length)×4.6 mm (internal diameter), 5 µm particle size. The carbon column can have a range of hydrophobicity, a pH acceptance range of 0 to 14, a pore size from 0 to 250, a carbon load range percent of 1 to 100, and a particle size of 3 µm, 5 µm, and 7 µm. The carbon column can have a specific surface area of 120 $m^2$/g, a 250 Å median pore diameter, and a 75% porosity. In some embodiments, the packing material of the carbon column can withstand a pressure of at least 400 bar. Detection can be performed using a UV detector operating at 254 nm and a fluorescence detector with excitation at 200 nm, and emission at 300 nm. Advantageously, the method is performed at 30° C., at approximately ambient temperatures.

Samples for analysis are prepared by measuring 100 μL (which can be approximately equal to 95 mg) and performing a first dilution of the sample in 900 μL of methanol. The first diluted mixture is filtered through a 0.2 μm syringe filter producing a filtered mixture, and then a second dilution is performed on the filtered mixture of 1 part sample to 10 parts methanol prior to injection into the high-performance liquid chromatograph system. The sample is otherwise not additionally processed before analysis. Advantageously, the lack of significant or complex pre-processing of the industrial sample reduces time and labor to obtain the results without sacrificing accuracy and component separation.

The injection volume of the analyzed composition can be up to 10 μL. The separation is performed utilizing gradient elution. The mobile phase flow rate for the method can be in the range of 0.1 mL/min to 1.0 mL/min, alternately 0.25 mL/min to 1.0 mL/min, alternately 0.5 mL/min to 1.0 mL/min, alternately 0.75 mL/min to 1.0 mL/min, and alternately less than or equal to 1.0 mL/min. In some preferred embodiments, the mobile phase flow rate for the method is 1.0 mL/min. The total run time is 65 minutes.

An organic acid in water is utilized with an alcohol for the mobile phase. In some embodiments, the organic acid is acetic acid. In some embodiments, the organic acid is trifluoro acetic acid. In some embodiments, the organic acid is formic acid. In some embodiments, the organic acid is an aqueous composition of 0.1 vol % organic acid in water. In preferred embodiments, the organic acid is an aqueous composition of 0.1 vol % formic acid in water. Alcohols with Hildebrand solubility factors of equal to or greater than 20 MpA$^{1/2}$ can be utilized. In preferred embodiments, the alcohol is methanol. Other alcohols with similar solubility factors to methanol can be used. In some embodiments, the alcohol is n-butyl alcohol. In preferred embodiments for xylene isomer separation, 0.1 vol % formic acid in water is the organic acid in water and methanol is the alcohol.

In the method, as time passes and the mobile phase is injected into the column, the concentration of the mobile phase is changed by increasing and decreasing the two components: organic acid in water and alcohol. The concentration of the alcohol in the mobile phase is increased over time, and the concentration of the organic acid in water in the mobile phase is decreased over time, such that the mobile phase reaches a concentration of 100% of the alcohol and 0% of the organic acid in water. In some embodiments, the concentration of the mobile phase is held at 100% alcohol for a period of time. Not to be bound by theory, but the use of high concentration of alcohol at 100% of the mobile phase appears to allow for the other compounds, and potential contaminants, from the industrial samples to be cleaned from the column in order to enhance the BTEX identification. The increase in the alcohol concentration removes more hydrophobic compounds present in the samples from the column. These hydrophobic compounds are more likely to be present in industrial process samples, and are problematic for quantification and separation of BTEX compounds. Proceeding the increase in the alcohol to 100% of the mobile phase concentration, the concentration of the organic acid in water in the mobile phase is increased over time, and the concentration of the alcohol in the mobile phase is decreased over time. Table 1 shows the gradient elution and mobile phase component concentration in volume percentage of the mobile phase. The proper combination of alcohol and acid, and the varying concentrations of the mobile phase components, assist in allowing for xylene isomer peak separation.

TABLE 1

Mobile Phase Concentrations

| Time (min) | Organic Acid in Water (vol % of the mobile phase) | Alcohol (vol % of the mobile phase) |
|---|---|---|
| 0.00 | 50 | 50 |
| 40.0 | 20 | 80 |
| 50.0 | 0 | 100 |
| 55.0 | 0 | 100 |
| 55.1 | 50 | 50 |
| 65.0 | 50 | 50 |

The final composition of 50% of the organic acid in water and 50% of alcohol is held for the time period between 55.1 and 65.0 minutes to allow the system to get equilibrated for the next separation. The system can generate a chromatogram for the composition being analyzed.

Figure 3:
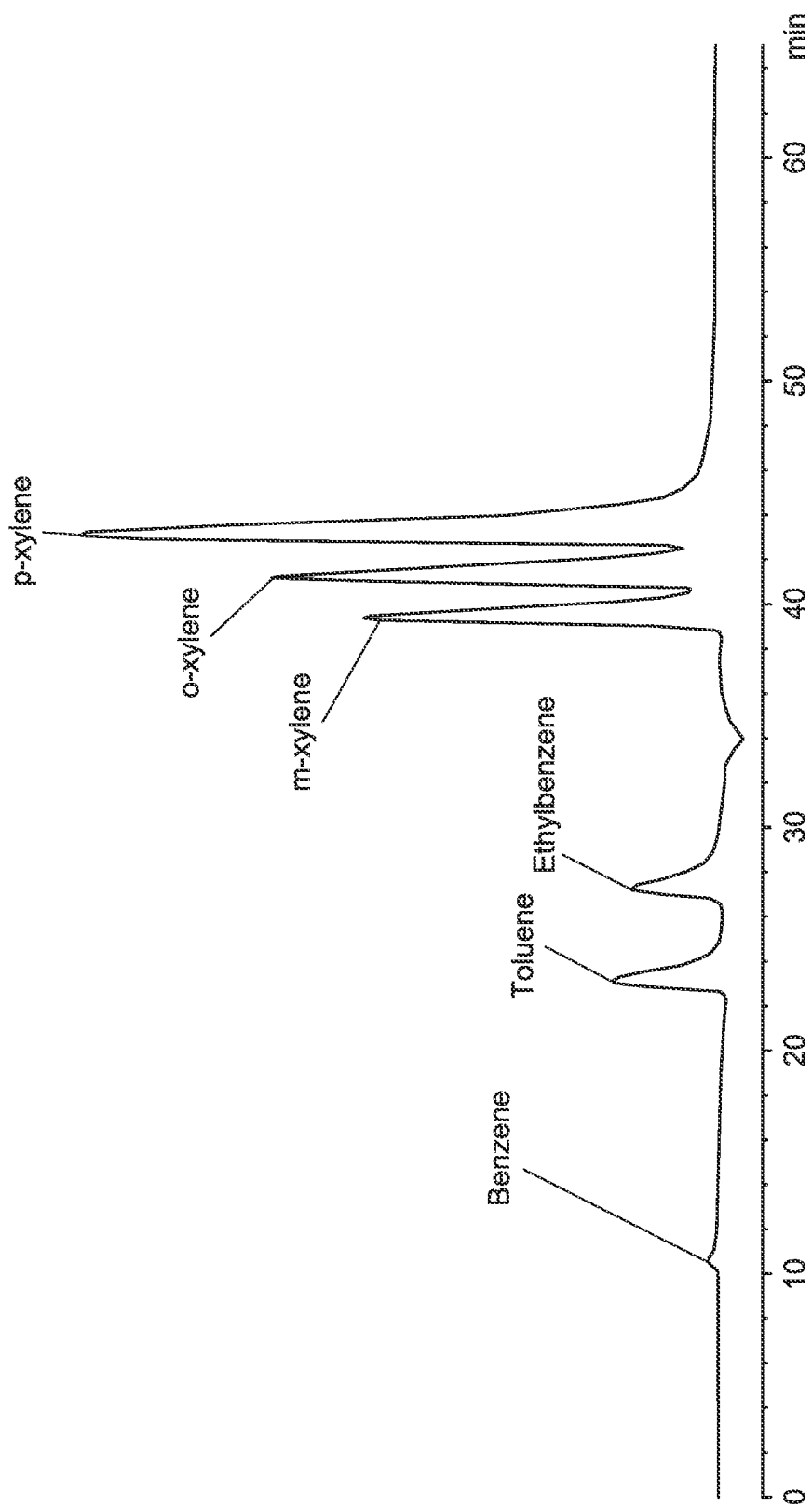
FIG. 3 is a chromatogram of a standard mixture from the high performance liquid chromatography methods, according to an embodiment.

Referring to FIG. 3, a chromatograph depicting the results of the analysis of a standard mixture containing benzene, toluene, ethyl benzene, o-xylene, m-xylene, and p-xylene in accordance with the methods disclosed herein is shown. The standard mixture was prepared in methanol according to the sample preparation method outlined above. The mobile phase included 0.1% formic acid in water as the organic acid in water and methanol as the alcohol.

Figure 4:
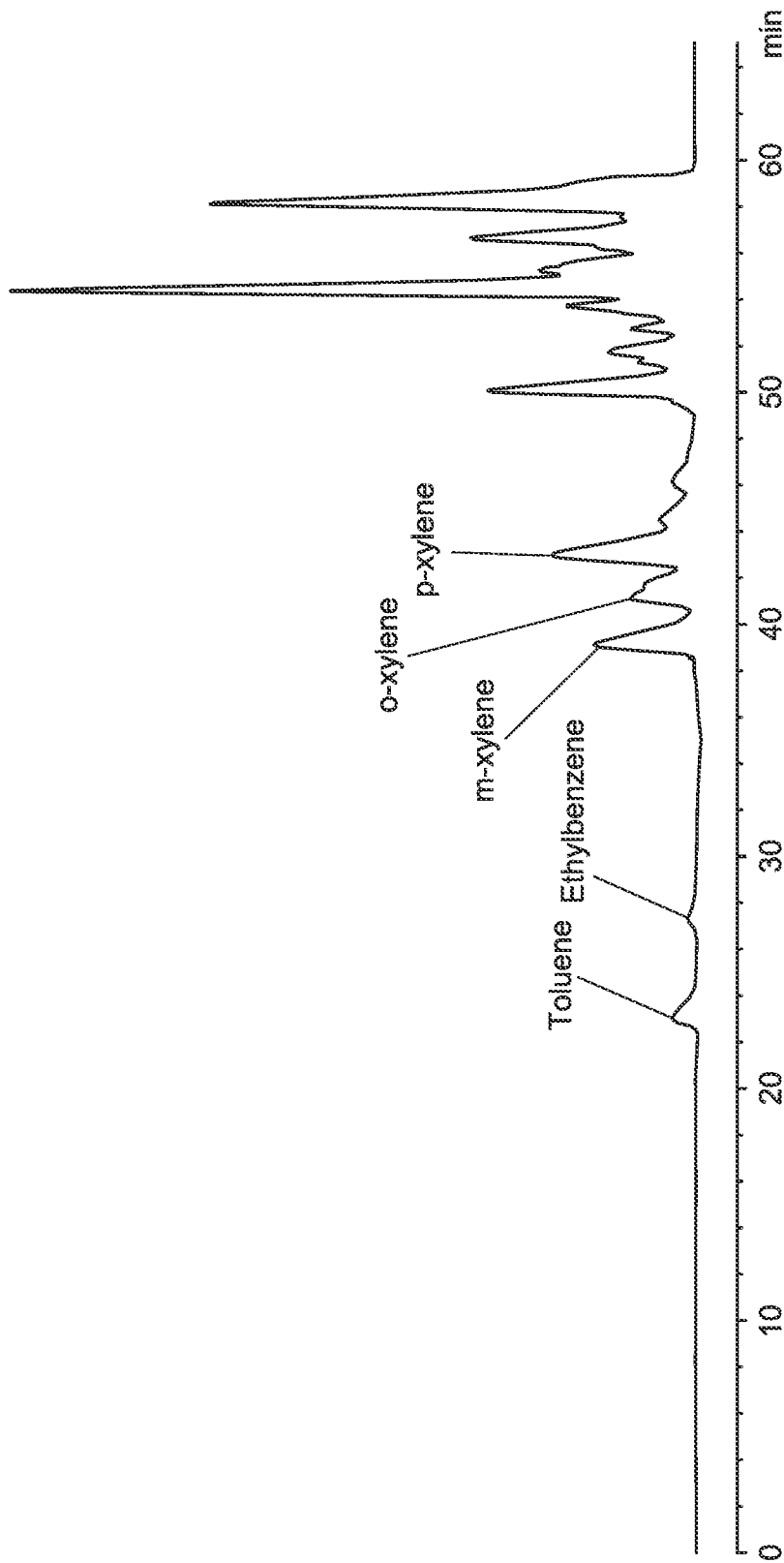
FIG. 4 is a chromatogram of a refinery sample from the high performance liquid chromatography methods, according to an embodiment.

Referring to FIG. 4, a chromatograph depicting the results of the analysis of a hydrodearylated aromatic bottoms stream containing BTEX compounds in accordance with the methods disclosed herein is shown. The mobile phase included 0.1 vol % formic acid in water as the organic acid in water and methanol as the alcohol. As shown in FIGS. 3 and 4, the resolution between two adjacent xylene isomer peaks, including between o-xylene, and p-xylene, using the methods disclosed herein is greater than 2.0. The resolution (Rs) is determined according to the following equation (EQ. 1):

$$Rs = 2*(t_{R2} - t_{R1})/(w_{b1} + w_{b2}) \quad \text{EQ. 1}$$

where Rs is the resolution between compound 1 and compound 2, where compound 1 elutes before compound 2; $t_{R1}$ is the retention time for compound 1; $t_{R2}$ is the retention time for compound 2; $w_{b1}$ is the peak width for compound 1; and $w_{b2}$ is the peak width for compound 2. Resolutions of 2 or greater are needed for clear separation of two peaks.

Quantitation of xylene isomers can be performed by preparing calibration standards of varying concentrations of isomers and measuring the response (peak height or peak area) from the fluorescence detector. The concentrations of the calibration standards include 10 ppmw, 50 ppmw, 100 ppmw, and 500 ppmw. Linear calibration plots can then be constructed for each isomer. Linear calibration plots are generated by charting the concentration in ppm of the standard calibration HPLC runs against the peak height or the peak area for the concentration values for each compound. The linear calibration plots can be then used to quantitate the amount of each isomer in the prepared sample. Once the linear calibration plots are generated, the concentration of the prepared sample (which was diluted during the preparation steps) is interpolated from the linear calibration plots using the peak height or peak area of the prepared sample. The mass of the compound is then calculated from the prepared sample using the interpolated concentration, and then the mass is multiplied by the dilution factor to obtain the sample mass of the original sample, pre-dilution. The sample mass can then be converted to weight percentage utilizing the total sample weight.

What is claimed is:

1. A method for the determination of concentrations of aromatic hydrocarbon components in industrial samples, the method comprising the steps of:
    injecting a prepared sample into a high-performance liquid chromatography column, wherein the high-performance liquid chromatography column comprises a carbon stationary phase, further wherein the prepared sample comprises the aromatic hydrocarbon components, wherein the aromatic hydrocarbon components are selected from the group consisting of: benzene, toluene, ethyl benzene, xylene isomers, and combinations of the same, wherein the xylene isomers are selected from the group consisting of: o-xylene, p-xylene, m-xylene, and combinations of the same;
    introducing a mobile phase into the carbon stationary phase, wherein the mobile phase comprises an organic acid in water and an alcohol;
    increasing the concentration of the alcohol in the mobile phase and decreasing the concentration of the organic acid in water in the mobile phase such that the mobile phase reaches a concentration of 100% of the alcohol and 0% of the organic acid in water, such that a gradient elution is performed; then
    decreasing the concentration of the alcohol in the mobile phase and increasing the concentration of the organic acid in water in the mobile phase; and
    quantitating, based on the gradient elution, a concentration of the xylene isomers in the prepared sample.

2. The method of claim 1, wherein the method produces a resolution of greater than 2.0 of p-xylene from o-xylene and ethyl benzene.

3. The method of claim 1, wherein the prepared sample is prepared from a sample comprising a xylene isomers concentration in the range from 0.001 wt % to 0.05 wt %.

4. The method of claim 1, further comprising the steps of:
    preparing a sample for analysis by:
        diluting the sample with an alcohol, generating a first dilution;
        filtering the first dilution, generating a filtered first dilution;
        diluting the filtered first dilution with alcohol, generating the prepared sample.

5. The method of claim 1, wherein the alcohol is methanol.

6. The method of claim 1, wherein the concentration of organic acid is 0.1 vol % in water.

7. The method of claim 6, wherein the organic acid is formic acid.

8. The method of claim 6, wherein the steps of increasing the concentration of the alcohol in the mobile phase and decreasing the concentration of the organic acid in water in the mobile phase, then decreasing the concentration of the alcohol in the mobile phase and increasing the concentration of the organic acid in water in the mobile phase, is carried out in accordance with the following time intervals and concentrations:

| Time (min) | 0.1 vol % Organic Acid in Water (vol % of the mobile phase) | Alcohol (vol % of the mobile phase) |
| --- | --- | --- |
| 0.00 | 50 | 50 |
| 40.0 | 20 | 80 |
| 50.0 | 0 | 100 |
| 55.0 | 0 | 100 |
| 55.1 | 50 | 50 |
| 65.0 | 50 | 50. |

9. The method of claim 1, wherein the mobile phase is introduced at a rate of less than or equal to 1 mL/minute.

10. The method of claim 1, wherein the carbon stationary phase is a porous graphitic carbon stationary phase.

11. The method of claim 1, wherein the prepared sample is obtained from an industrial process.

12. The method of claim 11, wherein the industrial process is selected from the group consisting of: aromatics processing, aromatics separation, hydrodearylation, transalkylation, fluid catalytic cracking, thermal cracking, steam cracking, hydroprocessing, reforming, petrochemical processing, and combinations of the same.

13. The method of claim 1, wherein the step of quantitating, based on the gradient elution, a concentration of the o-xylene, p-xylene, and m-xylene components in the prepared sample comprises the steps of:
    analyzing a calibration standard by:
        injecting a calibration standard into a high-performance liquid chromatography column, wherein the high-performance liquid chromatography column comprises a carbon stationary phase, further wherein the calibration standard comprises aromatic hydrocarbon components, wherein the aromatic hydrocarbon components are selected from the group consisting of: benzene, toluene, ethyl benzene, xylene isomers, and combinations of the same, wherein the xylene isomers are selected from the group consisting of: o-xylene, p-xylene, m-xylene, and combinations of the same;
        introducing a mobile phase into the carbon stationary phase, wherein the mobile phase comprises an organic acid in water and an alcohol;
        increasing the concentration of the alcohol in the mobile phase and decreasing the concentration of the organic acid in water in the mobile phase such that the mobile phase reaches a concentration of 100% of the alcohol and 0% of the organic acid in water, such that a gradient elution is performed; then
        decreasing the concentration of the alcohol in the mobile phase and increasing the concentration of the organic acid in water in the mobile phase; and
        generating a calibration standard chromatogram;
    constructing a linear calibration plot for o-xylene, p-xylene, and m-xylene based upon the calibration standard chromatogram;
    determining a peak height of each of o-xylene, p-xylene, and m-xylene peaks, the peak height being calculated from a resulting sample chromatogram, wherein the resulting sample chromatogram is generated by an analysis of the prepared sample; and
    calculating a quantity of each of o-xylene, p-xylene, and m-xylene in the prepared sample by correlating the resulting sample chromatogram with the linear calibration plot.

14. The method of claim 1, wherein the step of quantitating, based on the gradient elution, a concentration of the o-xylene, p-xylene, and m-xylene components in the prepared sample comprises the steps of:
  analyzing a calibration standard by:
    injecting a calibration standard into a high-performance liquid chromatography column, wherein the high-performance liquid chromatography column comprises a carbon stationary phase, further wherein the calibration standard comprises aromatic hydrocarbon components, wherein the aromatic hydrocarbon components are selected from the group consisting of: benzene, toluene, ethyl benzene, xylene isomers, and combinations of the same, wherein the xylene isomers are selected from the group consisting of: o-xylene, p-xylene, m-xylene, and combinations of the same;
    introducing a mobile phase into the carbon stationary phase, wherein the mobile phase comprises an organic acid in water and an alcohol;
    increasing the concentration of the alcohol in the mobile phase and decreasing the concentration of the organic acid in water in the mobile phase such that the mobile phase reaches a concentration of 100% of the alcohol and 0% of the organic acid in water, such that a gradient elution is performed; then
    decreasing the concentration of the alcohol in the mobile phase and increasing the concentration of the organic acid in water in the mobile phase; and
    generating a calibration standard chromatogram;
  constructing a linear calibration plot for o-xylene, p-xylene, and m-xylene based upon the calibration standard chromatogram;
  determining a peak area of each of o-xylene, p-xylene, and m-xylene peaks, the peak area being calculated from a resulting sample chromatogram, wherein the resulting sample chromatogram is generated by an analysis of the prepared sample; and
  calculating a quantity of each of o-xylene, p-xylene, and m-xylene in the prepared sample by correlating the resulting sample chromatogram with the linear calibration plot.

* * * * *